United States Patent
Dow et al.

(10) Patent No.: US 7,912,721 B2
(45) Date of Patent: Mar. 22, 2011

(54) SYSTEM AND METHOD FOR AUTOMATIC SPEECH RECOGNITION

(75) Inventors: Barry Neil Dow, Gosport (GB); Stephen Graham Copinger Lawrence, Southampton (GB); John Brian Pickering, Winchester (GB)

(73) Assignee: Nuance Communications, Inc., Burlington, MA (US)

( * ) Notice: Subject to any disclaimer, the term of this patent is extended or adjusted under 35 U.S.C. 154(b) by 783 days.

(21) Appl. No.: 11/322,086

(22) Filed: Dec. 29, 2005

(65) Prior Publication Data
US 2006/0224384 A1    Oct. 5, 2006

(30) Foreign Application Priority Data
Mar. 31, 2005    (GB) .................................. 0506528.9

(51) Int. Cl.
G10L 21/00 (2006.01)
G10L 15/04 (2006.01)
G10L 15/00 (2006.01)

(52) U.S. Cl. ......... 704/270; 704/251; 704/252; 704/257
(58) Field of Classification Search .................. 704/249, 704/256, 257, 251, 252, 270
See application file for complete search history.

(56) References Cited

U.S. PATENT DOCUMENTS

| | | | |
|---|---|---|---|
| 6,151,575 A | 11/2000 | Newman et al. | |
| 6,236,965 B1* | 5/2001 | Kim et al. | 704/254 |
| 6,389,394 B1* | 5/2002 | Fanty | 704/249 |
| 6,434,521 B1* | 8/2002 | Barnard | 704/244 |
| 7,113,908 B2* | 9/2006 | Goronzy et al. | 704/244 |
| 7,139,708 B1* | 11/2006 | Olorenshaw et al. | 704/254 |
| 2002/0173966 A1* | 11/2002 | Henton | 704/277 |
| 2004/0148161 A1* | 7/2004 | Das et al. | 704/224 |
| 2005/0197837 A1* | 9/2005 | Suontausta et al. | 704/260 |
| 2006/0143008 A1* | 6/2006 | Schneider et al. | 704/251 |

OTHER PUBLICATIONS

Huang "Accent modeling based on pronunciation dictionary adaptation for large vocabulary mandarin speech recognition", Sixth International Conference on Spoken Language Processing, 2000.*
Liu et al. "Partial change accent models for accented Mandarin speech recognition", IEEE workshop on automatic speech recognition and understanding, 2003.*
Goronzy "Automatic pronunciation modelling for multiple non-native accents", IEEE Workshop on Automatic Speech Recognition and Understanding, 2003.*

(Continued)

*Primary Examiner* — James S Wozniak
*Assistant Examiner* — Jialong He
(74) *Attorney, Agent, or Firm* — Wolf, Greenfield & Sacks, P.C.

(57) ABSTRACT

A system and method for automatic recognition of foreign speakers by performing analysis of a speech sample to produce a signal representative thereof and attempting to match the representative signal to one of a plurality of predetermined sounds to produce recognition; and determining whether a gap exists in a table of predetermined sounds in a predetermined language and, if a gap exists, substituting for matching a sound from a position in the table near the gap. This automatic substitution of known foreign pronunciation characteristics improves and modifies the output from standard, monolingual automatic speech recognition. There is no requirement to implement either adaptation or to impose additional manual modification of the baseform pool on the application developer. In addition, the danger of increased ambiguity is removed by introducing an explicit accent and/or language checker which queries known differences across accents.

4 Claims, 4 Drawing Sheets

OTHER PUBLICATIONS

Schaden, "Generating non-native pronunciation lexicons by phonological rules", International Congress of Phonetic Science, 2003.*

Fischer, V., et al., "Multilingual Acoustic Models for the Recognition of Non-Native Speech", Automatic Speech Rec. & Understanding Workshop, 2001.

Fischer, V., et al., "Likelihood Combination & Recognition Output Voting for the Decoding of Non-Native Speech with Multilingual HMMS", ICSLP 2002.

* cited by examiner

SYSTEM AND METHOD FOR AUTOMATIC SPEECH RECOGNITION

CROSS-REFERENCE TO RELATED APPLICATIONS

This application claims the benefit of United Kingdom Patent Application No. 0506528.9 filed Mar. 31, 2005.

FIELD OF THE INVENTION

This invention relates to automatic speech recognition (ASR), and particularly (though not exclusively) to recognition of foreign speech.

BACKGROUND OF THE INVENTION

In the field of this invention it is known that, with speaker-independent ASR such as in an automated telephone response system, if any speaker uses the system with a significantly different accent than the user population used to train the system, then recognition hit-rate or accuracy will be affected by the accent of that user; further, it is known that it is possible to model accents, both native and non-native, by careful manipulation of the associated baseforms (the pronunciations of the words in the recognition grammar).

It is known that it is possible to adapt dynamically to the accent or dialect of a given user population by allowing the statistical distributions within the acoustic model to be modified in accordance with the correct recognition results observed for that user population. The acoustic model contains a number of states and transitions, both represented by Gaussian (normal) probability densities, which, by definition, are defined by a mean value and a standard deviation. For a given user-population, either the mean or the standard deviation or both will vary from the generalised values in the acoustic model for the general user population. Therefore, dynamic adaptation allows the mean and/or standard deviation to shift to values more appropriate to the user population. In concrete terms: there might be a mean value of X for the general population. For a specific population, the mean may consistently be less than X. Therefore, adaptation would have X shift downwards (N.B.: there are many Gaussian distributions, and therefore many X's and associated standard deviations.)

However, this approach has the disadvantage that what was a generalised and general purpose recognition system is now geared specifically to a given user population. In consequence, it is no longer appropriate for all users. Hit-rate may decrease even for speakers of standard variants of a given language.

Another way to cater for multiple accent types would be to include additional pronunciations, known as baseforms, for one and the same word. For example, the name of the UK town 'Hull' is pronounced with a very different vowel sound in Southern British English from Northern British English, and so two baseforms for this word would be included. If account is then taken of the fact that many speakers either in the North or in the South may well not pronounce the 'H' at the beginning, then this results in four variants for 'Hull': H AH L, H UH L, AH L, and UH L.

However, this approach has the disadvantage(s) that manually increasing the baseform variants for any given term can lead to increased ambiguity within the recognisor, and therefore can reduce the overall hit-rate or accuracy, and can even reduce the efficiency of the recognisor. It is also known that adaptation can lead to the recognisor no longer being appropriate for use by the original user population or indeed by any users beyond those that have provided input to adapt the recognisor.

A need therefore exists for a system and method for automatic speech recognition wherein the abovementioned disadvantage(s) may be alleviated.

SUMMARY OF THE INVENTION

In accordance with a first aspect of the present invention there is provided a system for recognition of speech. The system includes means for performing analysis of a speech sample to produce a signal representative thereof and attempting to match the representative signal to one of a plurality of predetermined sounds to produce recognition. The system also includes means for determining whether a gap exists in a table of predetermined sounds in a predetermined language and, if a gap exists, substituting for matching a sound from a position in the table near the gap.

In accordance with a second aspect of the present invention there is provided a method for recognition of speech, which includes performing analysis of a speech sample to produce a signal representative thereof and attempting to match the representative signal to one of a plurality of predetermined sounds to produce recognition. The method also includes determining whether a gap exists in a table of predetermined sounds in a predetermined language and, if a gap exists, substituting for matching a sound from a position in the table near the gap.

Briefly stated, in a preferred form this invention relates to a method and system for automatic speech recognition (ASR) which automatically makes phone-label substitutions across languages such that a non-native speaker using a speech recognition system in a different language may still be understood and receive good recognition rates. The preferred method is based on identifying which phone-labels or sounds do not occur in a given non-native language, and allowing additional processing to cater for common substitutions, that is to allow for the non-native speaker's accent to be taken into account automatically as an additional process to standard recognition decoding.

BRIEF DESCRIPTION OF THE DRAWINGS

One system and method for recognition of foreign speakers incorporating the present invention will now be described, by way of example only, with reference to the accompanying drawing(s), in which.

DESCRIPTION OF THE PREFERRED EMBODIMENTS

Figure 1:
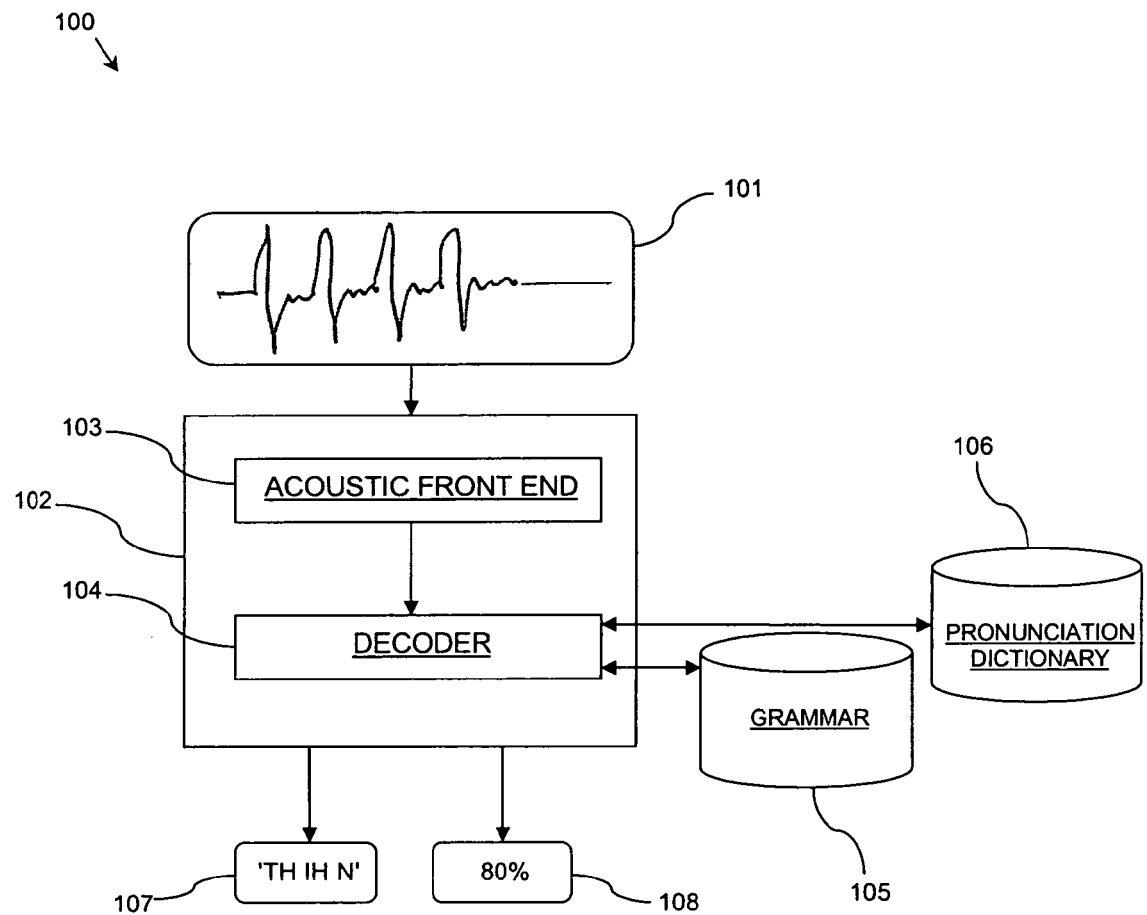
FIG. 1 shows standard recognition steps as known in the prior art.

Referring firstly to FIG. 1, a known simple speech recognition application is illustrated where the user is selecting a specific type of pizza from a known and finite list. For a speaker selecting a 'thin (crust)' pizza, the process as implemented in traditional recognition systems today is illustrated and explained in FIG. 1. The standard automatic speech recognition (ASR) process 100 takes an audio waveform 101 as input, which the recognition engine 102 processes as follows. The waveform 101 is first passed to the acoustic front end (AFE) 103 which seeks to remove background noise and any other such interference and begins to analyse the signal. This involves extracting short timeslices, say 50 ms each, and calculating a spectral section. Normalised vectors representing the polynomial derivative of the spectral section are then passed onto the decoder 104. The decoder 104 takes the normalised vectors and matches against an acoustic model of states and transitions which relate to a statistical distribution of acoustic information within the language. To match against appropriate states and transitions, the decoder 104 needs two sets of data: a grammar 105 and a pronunciation dictionary 106.

The grammar 105 contains all possible words and phrases expected to be said by the user of the service. For instance, for a pizza ordering application, these may include all possible toppings on offer (e.g., 'pepperoni', 'pineapple', etc.) and other appropriate information such as 'thin crust', 'deep pan' and so forth. Given all the possible words in the grammar 105, the pronunciation dictionary 106 is generated. This contains the pronunciation, or baseforms, for instance 'TH IH N' for 'thin', for all words likely to be said by the speaker or speakers. The sequence of 'TH IH N' in this case constrains the possible paths of states and transitions in the acoustic model, so the decoder 104 does not unnecessarily follow paths that will never occur, and reduces potential confusions.

Once the decoder 104 has processed all the spectral sections from the AFE 103, it then returns the sequence of sounds 107 and usually a confidence value 108 which relates to how close the match is deemed to be: how 'confident' the result may be regarded to be.

Figure 2:
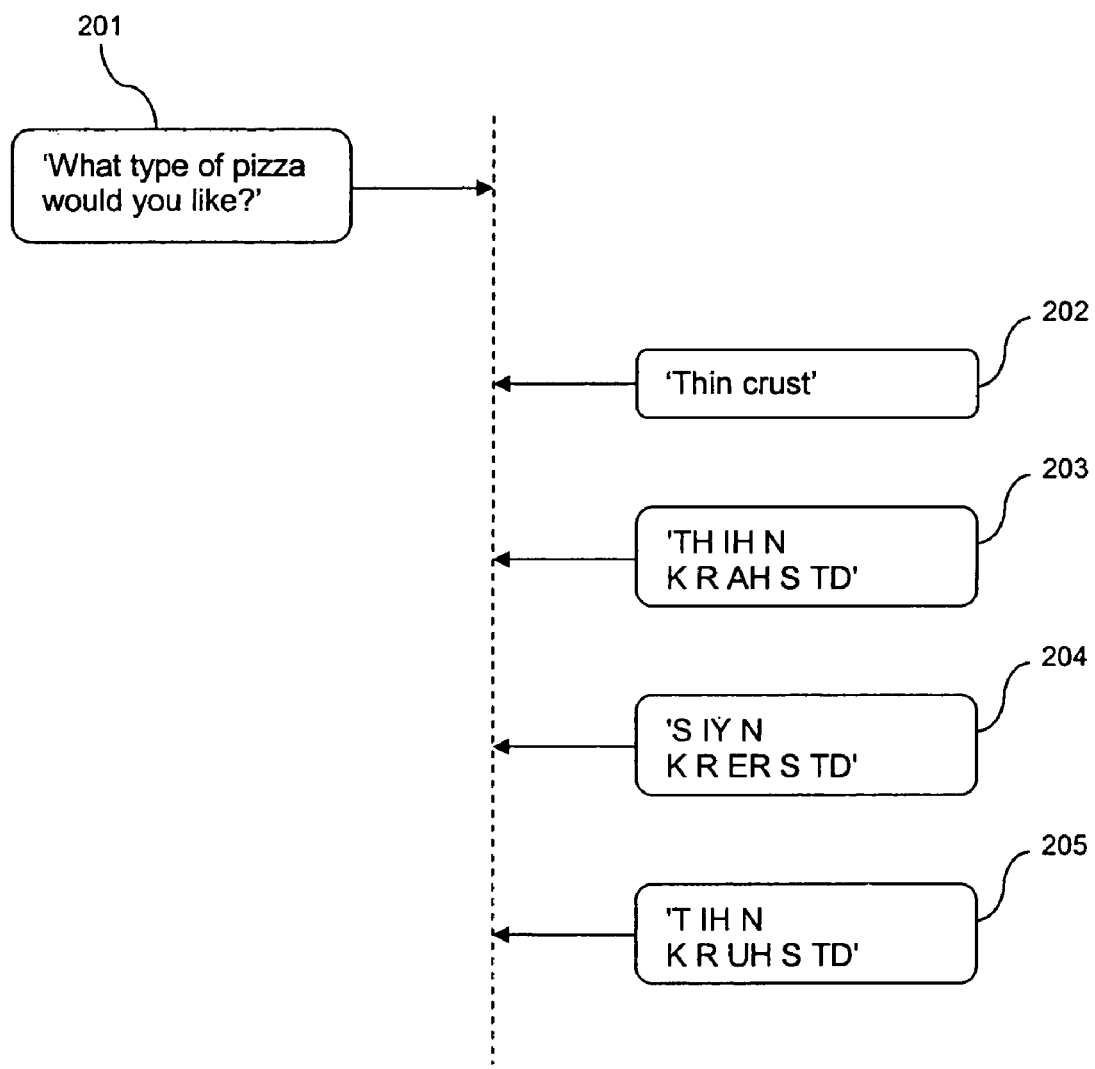
FIG. 2 illustrates the problem of multilingual recognition for speakers of UK English, French and Dutch.

FIG. 2 shows an example of a simple application, and the associated results from three speakers: an English speaker, a French speaker and a Dutch speaker. In response to the prompt 201 'What type of pizza would you like . . . ?', a possible result might be 'Thin crust' 202. However, non-native speakers may have an accent which is very different from the native speaker: for instance, while the English speaker may say something (203) recognisably like 'TH IH N K R AH S TD', the French speaker may say something (204) more like 'seen' than 'thin', and the Dutch speaker (205) may say something more like 'tin' than 'thin'. Unless the pronunciation dictionary 106 and possibly the grammar 105 contain these words, it is unlikely that they will be recognised successfully. Introducing additional entries and pronunciations, however, will proliferate the number of paths and potential ambiguities within the acoustic model.

Figure 3:
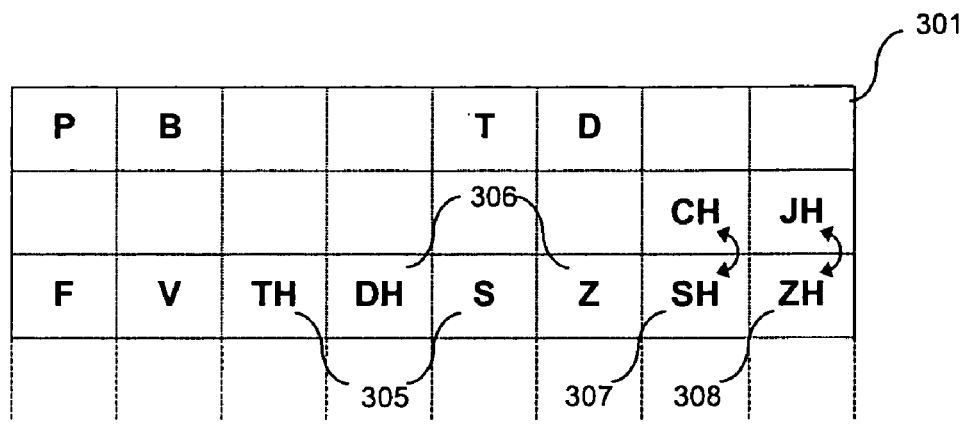
FIG. 3 shows language tables for a subset of consonants for universal use, for French and for English.
Figure 3:
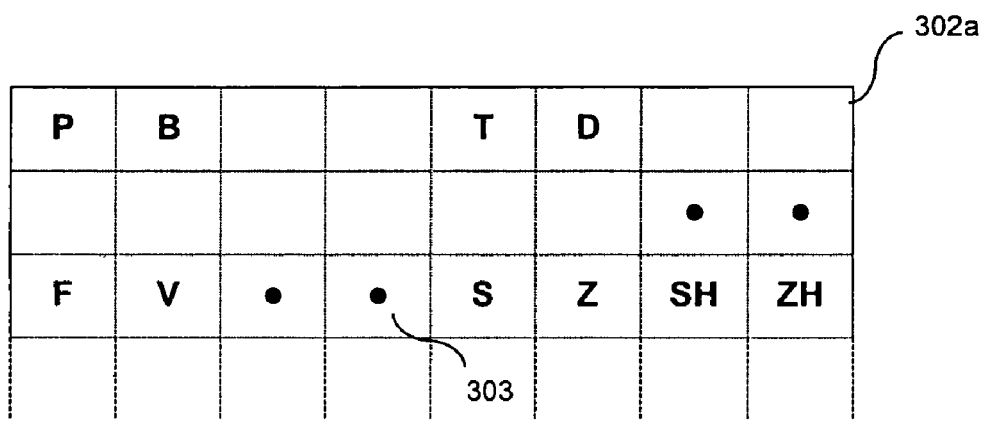
Figure 3:
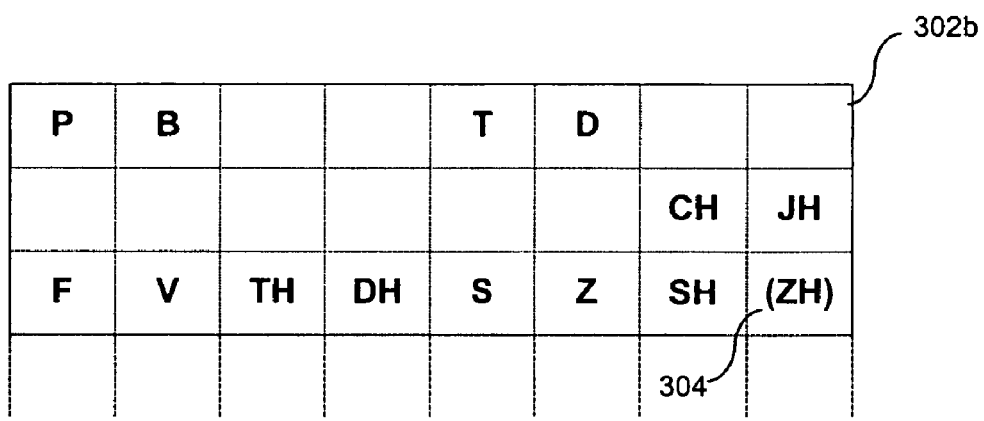

FIG. 3 begins to illustrate the proposed solution, and the methodology behind the current invention. It is possible to define all the sounds which a human being can produce, and in addition compare these with what a specific language uses. Table 301 shows a subset of all possible consonant sounds in respect of what is possible. The top line of the table 301, for instance, shows the consonants that occur at the beginning of the words 'put', 'book', 'take' and 'door'. The arrangement of symbols in tables such as 301 is common to most phonetic treatments of sound systems. A row is usually described as 'manner of articulation' (that is, whether the sound is continuous or interrupted and so forth) and the columns represent where in the mouth the tongue is when the sound is produced (the 'place of articulation'). For a given pair, such as P and B, the first sound is produced without voicing and the second sound, produced in the same manner and at the same place of articulation, is said to be voiced. The only important factor about this arrangement into columns and rows is that it should be consistent across all language tables.

By comparison to the universal table 301, specific tables for French 302a and English 302b contain only the actual subset of consonants from all possibilities in 301 which occur in those languages. French, as illustrated in table 302a, for instance, chooses not to use the consonants TH, DH, CH and JH as in the words 'thin', 'the', 'church' and 'judge'. Missing sounds like these by comparison with table 301 are indicated as • (303). By contrast, and considering English, then the sound ZH as in the middle of 'leisure' (or French 'jour') only exists in limited contexts (as indicated at 304 by the enclosure of the sound in parentheses): specifically, it does not usually occur in native English words at the beginning or the end.

By overlaying the language specific tables 302a and 302b, as well as comparing with the universal table 301, it is possible to establish where recognition problems may occur. For instance, because French does not use TH, then the word 'thin' is likely to be mispronounced in the example of FIG. 2. The decision as to which sound to substitute for the French speaker using an English application is resolved as follows. The rows and columns, as well as the voicing/non-voicing, in Table 301 are key to this resolution: if a language does not have a sound or rarely uses it, then the recognition process will go to the nearest cell in the same row (e.g., going to S in table 302a from the missing sound immediately to its left) or column (e.g., going to SH in table 302a from the missing sound above it), making sure for consonants that the voicing contrast is preserved from the target language: e.g., 306 versus 305, and 307 versus 308. The distinction between voiced sounds (such as 'DH' in English) and non-voiced sounds (such as 'TH' in English) is illustrated by the following example. 'DH' in English (e.g., the sound at the beginning of the English word 'the') is 'voiced' and is therefore said to be produced with 'voicing'; whereas 'TH' in English (e.g., the sound as in the English word 'thin') is 'unvoiced', and is said to be produced without 'voicing'. The substitution of 'TH' by 'S' in French therefore retains the 'voicing' feature (it is substituted in French by 'S' and not 'Z'; but 'DH' as a voiced sound is more like substituted by 'Z' in French, which is also voiced). The substitution of 'TH' by 'S' and of 'DH' by 'Z' serves to preserve voicing, and is an example of substitution within a row in FIG. 3; the substitution of 'CH' by 'SH', and 'JH' by 'ZH', preserve voicing, and are examples of substitution across columns. Although not for common European languages, the substitution of 'SH' by 'S' and of 'ZH' by 'Z' occurs in some cases.

Figure 4:
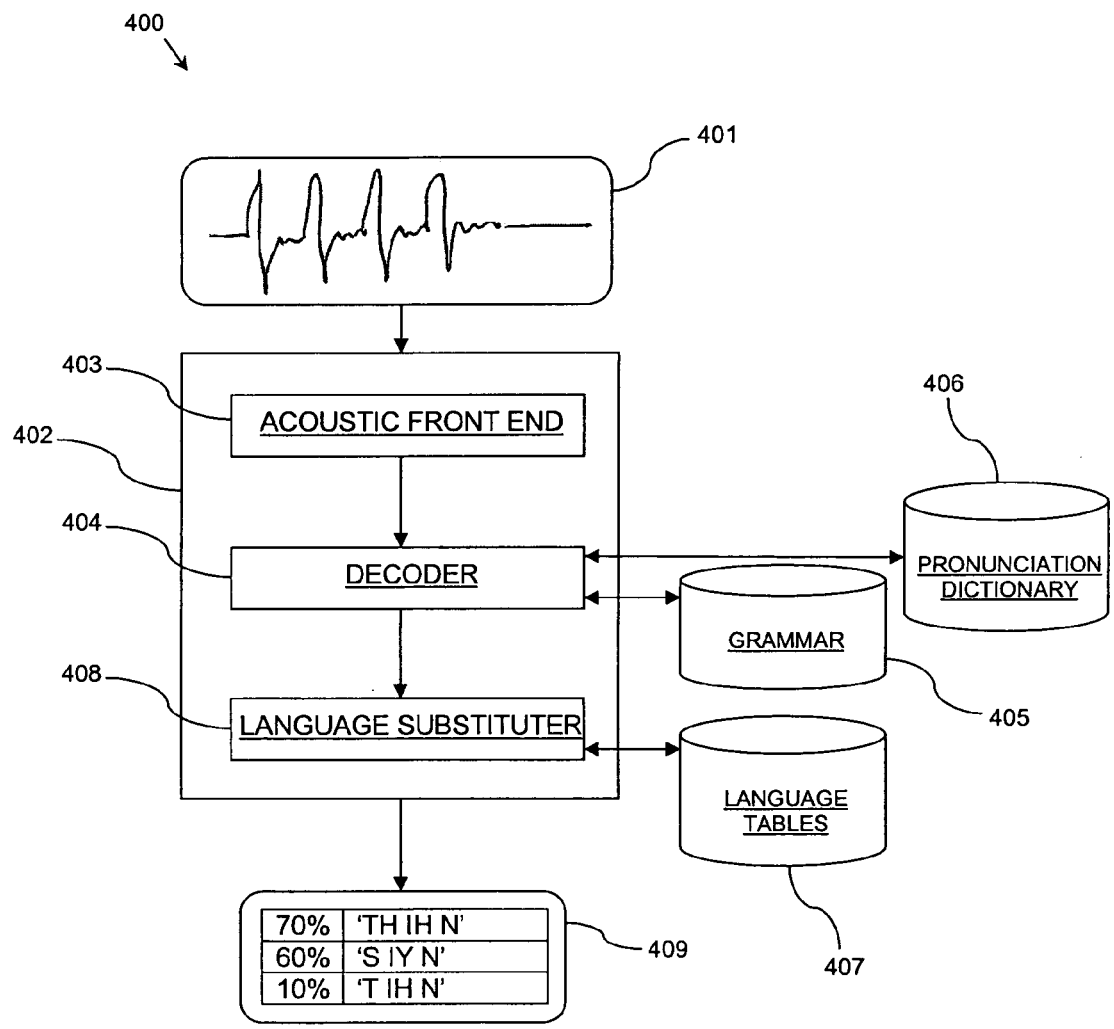
FIG. 4 shows a novel approach, incorporating the present invention, using the language tables of FIG. 3 to substitute additional potential results for standard recognition.

FIG. 4 illustrates what happens at runtime in a novel automatic speech recognition system 400 utilising the substitution process described above. The system 400 is similar to the basic ASR system 100 of FIG. 1. In the system 400 an incoming audio signal 401 is passed to an acoustic front end (AFE) 402 where it is analysed before submission to decoder 404, which uses a grammar 405 and an associated pronunciation dictionary 406 to try and establish which set of sounds have been spoken. So far the processes of system 100 and 400 are the same.

The system 400 of FIG. 4 includes a database 407 of all language tables as described previously. Although this could contain all consonant sounds and all vowel sounds for all languages, and a universal table could be generated by taking the overlap of all languages by definition, in practical terms, it is suggested that the database 407 be limited to known languages covering the intended user population of the system.

As the result is returned from the decoder 404, it is first submitted to a language substituter 408. The language substituter 408 is triggered if the confidence value (shown in the left hand column of 409) is below a given threshold, such as 80%. Based on the entry in 409 with the highest confidence (e.g., 'TH IH N'), a list of potential substitutions is generated with appropriate entries from the universal tables (301 in FIG. 3): e.g., 'S IY N' for French and 'T IH N' for Dutch in 409. If these are consistent (as explained below), then the highest scoring result, e.g., 'TH IH N', is returned and is substituted for the direct result from the decoder 404. The language tables associated with this result or results in 409 are used to update the pronunciation table 407 for subsequent attempts (i.e., the same speaker during the same telephone call) directly. Over successive attempts, therefore, a French speaker's pronunciation dictionary in the example of FIG. 2 will replace 'TH IH N' and 'K R AH S TD' with 'S IY N' and 'K R ER S T AX', only returning to the original (UK English pronunciation dictionary 407) when a new call is started, since this may involve a different language speaker.

'Consistent' above is intended to refer to consistency of an acoustic match with one of the hypothetical sound label sequences. The recognition result in the prior art is derived by the combination of the match of the incoming audio to both the sequences of sounds (the states and transitions in the acoustic model) and the grammar (the sequences of letters/words from the real language as used in the application). The audio here—i.e., the first matching against the states and transitions—may well match the sequence 'S IY N' much better, but is rejected or has its score reduced because it doesn't make sense when matched against the grammar. If, however, the acoustic match is consistent with one of the hypothetical sound label sequences (here 'S IY N') ignoring the grammar, then it is correct, merely represents different pronunciation (i.e., a foreign accent) and the most likely result ('TH IH N') can happily be returned from both the acoustic states/transitions match and the grammar match.

It will be appreciated that operation of the novel automatic speech recognition system described above may be enhanced by use of: (i) language-specific phonotactics (i.e., the rules governing sound sequences), and/or (ii) language identification (i.e., the process whereby the specific language of audio or text input can be classed to be, for instance, French or German and so forth).

For example, concerning feature (i), English phonotactics mean that 'sh' can't be followed by 'p' (for example, there's no English word that begins with 'SH P'). German phonotactics, however, permits this: thus 'sport' for a (Standard) German speaker sounds like 'shport' to an English speaker. In the novel ASR system described above, the sounds 'TH IH N' in the example above, or 'S P AO TD' in an application where 'sport' would be recognised, are substituted one-by-one and independently in the language substituter, using the tables. However, this would mean: (a) because 'S' and 'SH' occur in German as well as English, this substitution and a German foreign pronunciation of English 'sport' would never be picked up; and (b) if it were known that 'P' in German cannot be preceded by 'S' in the same syllable, but instead uses 'SH', then the German foreign pronunciation could be captured. In conclusion therefore, while the novel ASR system described above utilises a sound by sound substitution, phonotactics would allow the constraint or expansion of those substitutions based on which sounds are allowed to occur together in a given language.

By way of example, concerning feature (ii), if the incoming signal could be flagged as 'like French', then it would only be necessary to look at the French substitution table, and not any others. Further, it wouldn't be necessary to look at the universal table either—the English and the French substitution tables could just be overlapped straight away. It will be appreciated that language identification currently addresses only, for example, the issue of French, as spoken by native French speakers, versus English as spoken by native English speakers; it does not yet handle foreign accent.

It will be understood that the system and method for recognition of foreign speakers described above provides the following advantages: There is no requirement to implement either adaptation or to impose additional manual modification of the baseform pool (the pronunciation dictionary) on the application developer. In addition, the danger of increased ambiguity is removed by introducing an explicit accent and/or language checker which queries known differences across accents, as described.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A computer system for performing a method for recognition of speech by non-native speakers, the computer system comprising:

a database storing a universal table of sounds and a plurality of language-specific tables of sounds, each of the plurality of language-specific tables corresponding to a different language from a group of predetermined languages, wherein the universal table of sounds and each of the language-specific tables of sounds are arranged such that similar sounds are located proximate each other in the respective table, and wherein locations in each of the language-specific tables of sounds corresponding to sounds that are not pronounced in the associated language are marked as missing the corresponding sound;

at least one input to receive an audio signal derived from a speaker speaking in a language not native to the speaker; and at least one computer coupled to the input to receive the audio signal and capable of accessing the database, the at least one computer programmed to perform:

matching at least a portion of the audio signal against an acoustic model to, at least in part, to generate a first plurality of sounds corresponding to at least the portion of the audio signal;

identifying, for at least one given sound in the first plurality of sounds, at least one substitute sound in the universal table of sounds indicated as missing in at least one language-specific table of sounds, the at least one substitute sound being located proximate the at least one given sound;

substituting, for each one of the at least one substitute sounds, the one of the substitute sounds for the at least one given sound to form a respective second plurality of sounds;

generating a confidence score for the first plurality of sounds and for each of the second plurality of sounds; and selecting a preferred plurality of sounds from the first plurality of sounds and the second plurality of sounds based, at least in part, on the corresponding confidence score; and recognizing the portion of the speech signal based, at least in part, on the preferred plurality of sounds.

2. The computer system of claim 1, wherein each of the language-specific tables of sounds are arranged in rows and columns to represent manner of articulation and place of articulation of the sounds, respectively.

3. The computer system of claim 1, wherein the at least one computer is further programmed to perform updating a pronunciation dictionary with the language-specific table associated with the returned substitution during recognition of a first speaker providing the audio signal and reverting to a default pronunciation dictionary for a second speaker different from the first speaker.

4. The computer system of claim 1, wherein phonotactics associated with the predetermined languages are taken into account during substitution.

* * * * *